Jan. 2, 1940.   R. J. ALTGELT ET AL   2,185,880
HARROW
Filed June 3, 1937   3 Sheets-Sheet 1

Inventors:—
Rudolph J. Altgelt,
Cameron H. Gemberling.
By John P. Smith Atty.

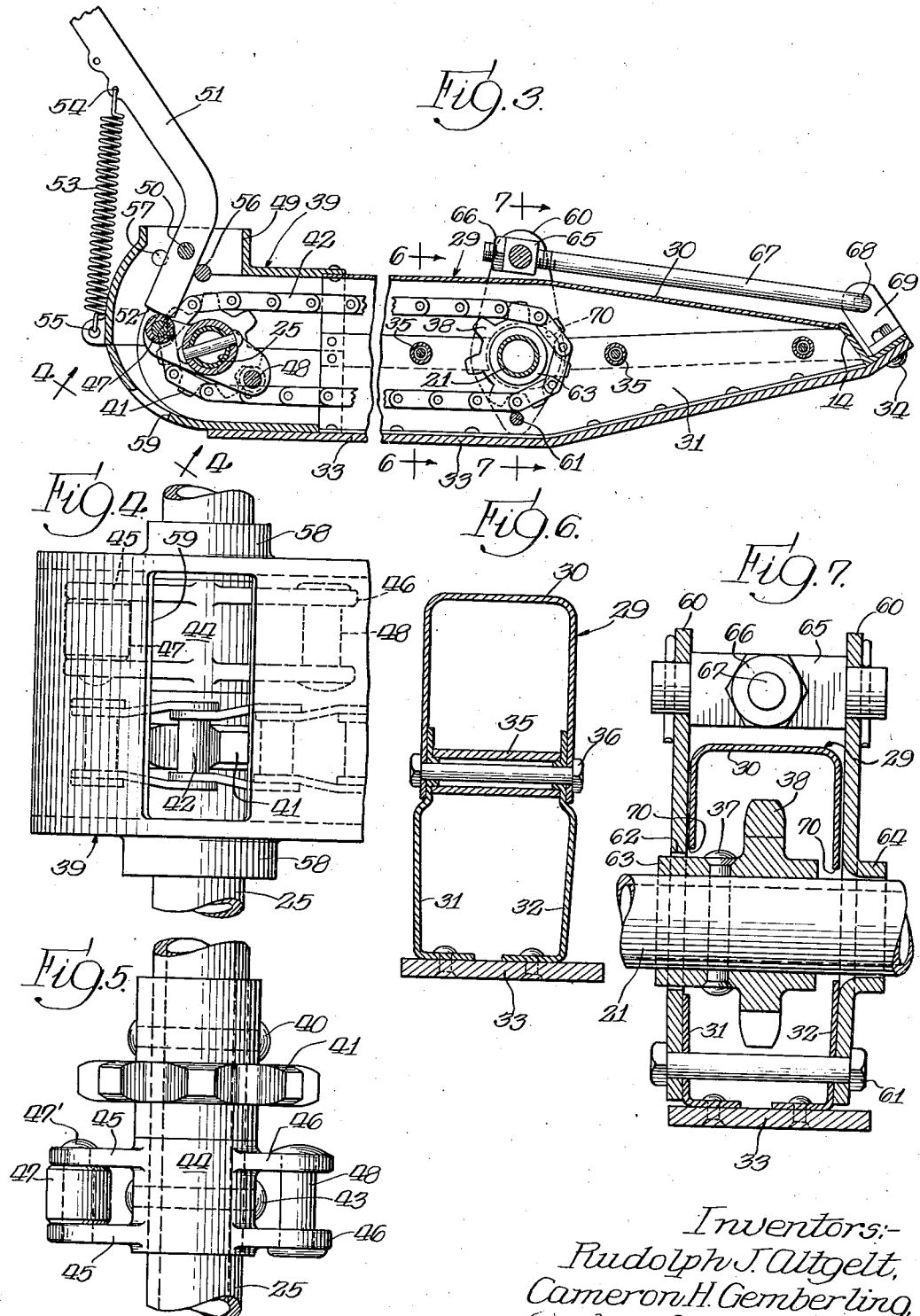

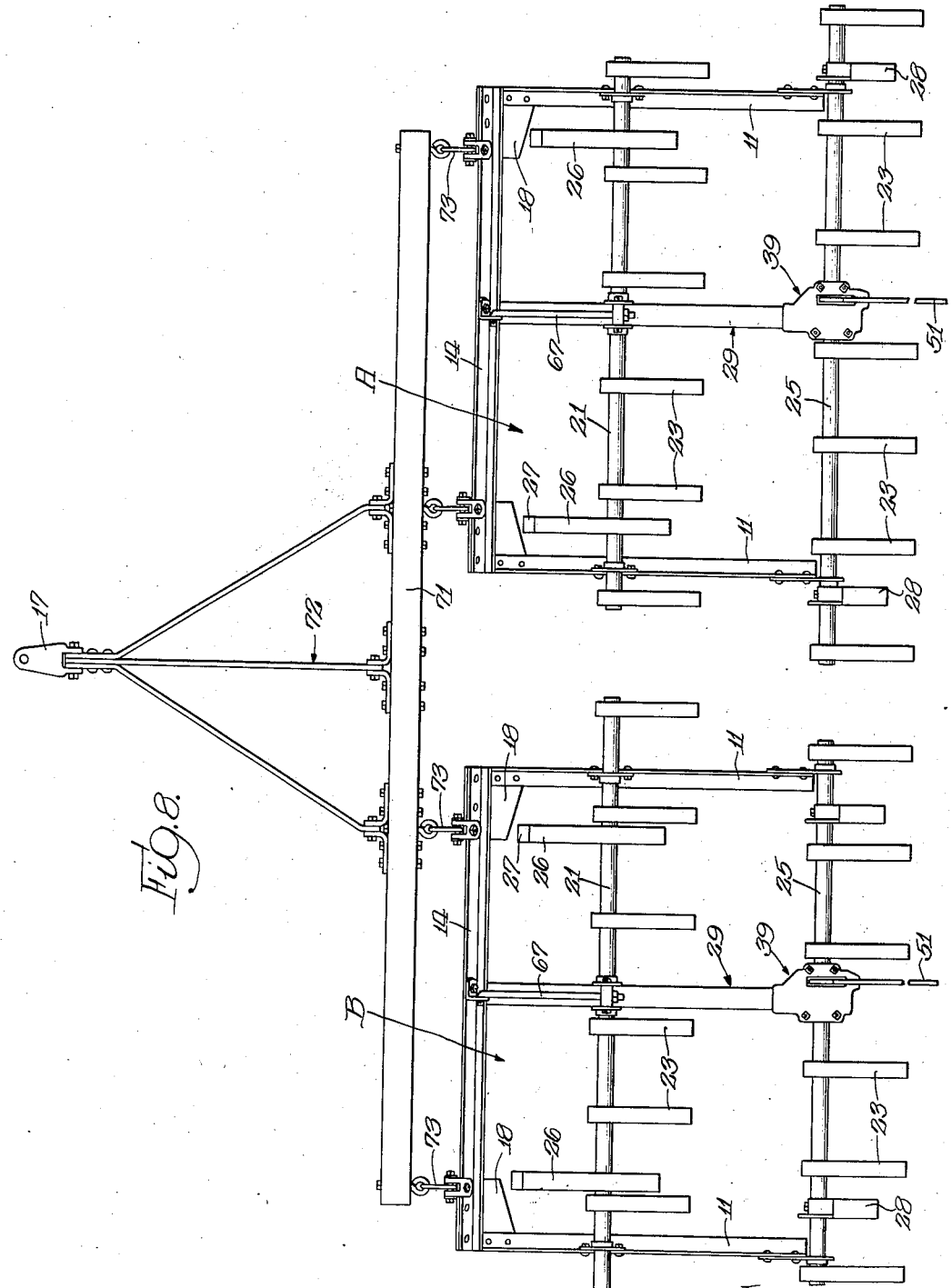

Patented Jan. 2, 1940

2,185,880

UNITED STATES PATENT OFFICE 2,185,880

HARROW

Rudolph J. Altgelt and Cameron H. Gemberling, South Bend, Ind., assignors, to Oliver Farm Equipment Company, a corporation of Delaware Application June 3, 1937, Serial No. 146,162

12 Claims. (Cl. 55—34)

The present invention relates generally to harrows, but more particularly to the rollover type of spring tooth harrow and means for controlling the actuation of the same as well as the adjustment of the depth of the teeth into the ground.

We are aware that the rollover spring tooth harrow has been used heretofore of a construction in which the teeth carrying shafts of these harrows are connected together by sets of cranks and pitman connections located on the sides of the harrow beyond the ends of these shafts for the purpose of revolving the shafts in unison. With this type of rollover harrow considerable objection has been found to the positioning of the pitmans and cranks beyond the ends of the shafts and at each side of the harrow structure. These pitmans form obstructions and prevent the harrowing of the ground contiguous to trees in orchard work. They are also objectionable when the harrow sections are used in multiple by hitching two or more of the sections to a single draw bar inasmuch as the pitmans interfere with one another and prevent the positioning of the harrow sections in sufficiently close position with respect to one another so as to properly cultivate the ground between the adjacent sections.

It is therefore one of the primary objects of the present invention not only to overcome the disadvantages of the rollover spring tooth harrow heretofore made, but to provide a simple driving and control mechanism located in the longitudinal center of each harrow section for adjusting and actuating the teeth supporting shafts in unison.

Another object of the invention is to provide a novel and improved spring tooth harrow of the rollover type in which a trip may be manipulated by means of a cord extending to the tractor seat or when drawn by horses, a lever may be tripped to simultaneously revolve the teeth supporting shafts in unison for removing the trash from the teeth on a continued forward movement of the harrow proper.

A still further object of the invention is to provide a novel and improved spring tooth harrow of the rollover type in which the driving runners are provided with prongs located in close proximity to the ground so that the same engage the ground before the spring teeth are lifted out of the ground in combination with shields which perform the double function of bracing the frame structure and shielding the prongs from gathering trash as the harrow proper is drawn over the ground.

Another object of the invention is to provide a novel and improved spring tooth harrow of the rollover type in which a driving connection for simultaneously revolving the front and rear teeth supporting shafts is located in the longitudinal center of the harrow section, thereby permitting front and rear shafts to be alternately long or short on the adjacent harrow sections when two or more of these sections are drawn by a single draw bar. With this arrangement the spring teeth carried by the shafts outside the frame of the harrow sections may be placed in sufficiently close proximity to the teeth of the adjacent harrow to insure proper cultivation of the ground between the adjacent sections.

These and other objects are accomplished by providing a construction and an arrangement of the various parts in the manner hereinafter described and particularly pointed out in the appended claims.

Referring to the drawings:

Fig. 3 is an enlarged cross sectional view of the driving mechanism which simultaneously revolves the front and rear teeth shafts in unison;

Fig. 4 is an enlarged cross sectional view taken on the line 4—4 in Fig. 3;

Fig. 5 is an enlarged fragmentary top plan view of one of the driving sprockets and associated clutch mechanism;

Fig. 6 is an enlarged cross sectional view taken on the line 6—6 in Fig. 3;

Fig. 7 is an enlarged cross sectional view taken on the line 7—7 in Fig. 3; and

Fig. 8 is a top plan view showing the manner in which a multiple number of harrow sections may be connected through common draft means.

Figure 1:
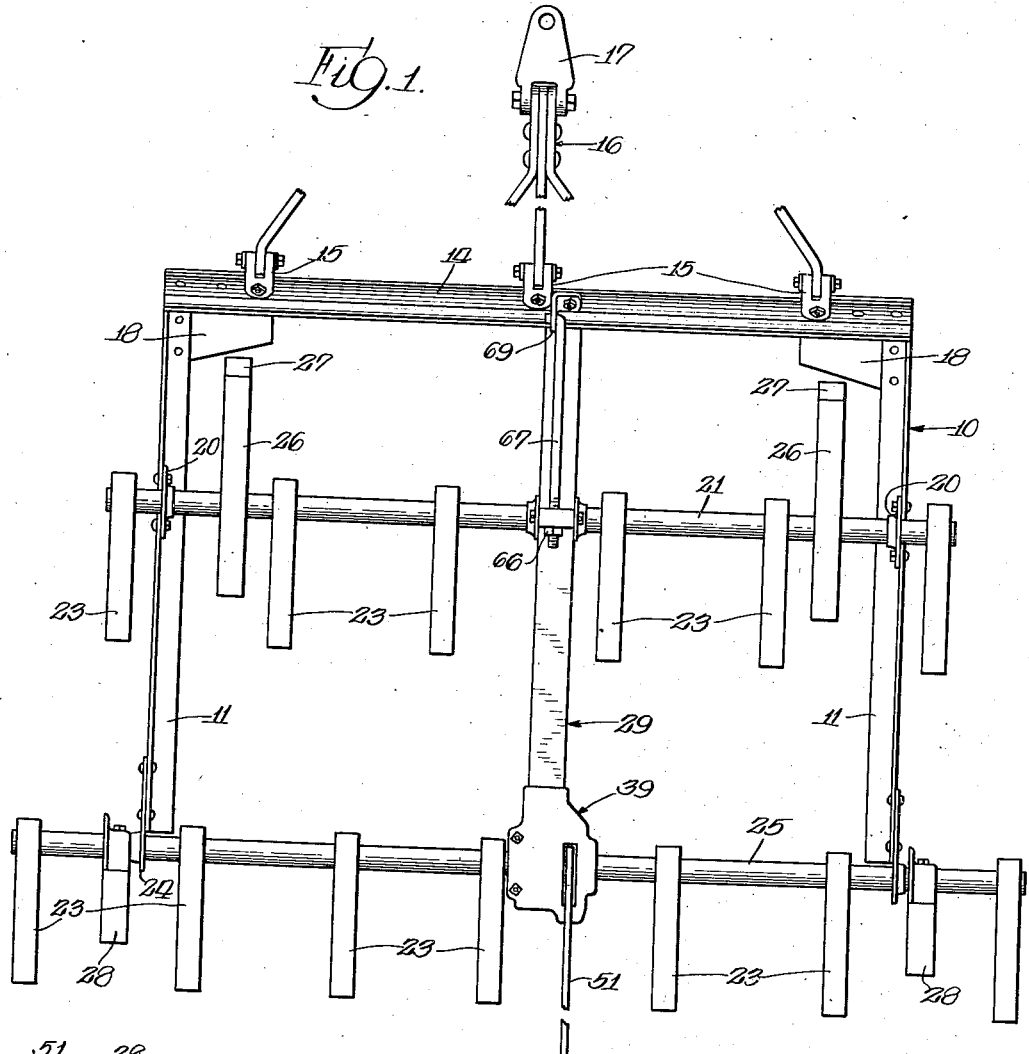
Fig. 1 is a top plan view of our improved spring tooth harrow.
Figure 2:
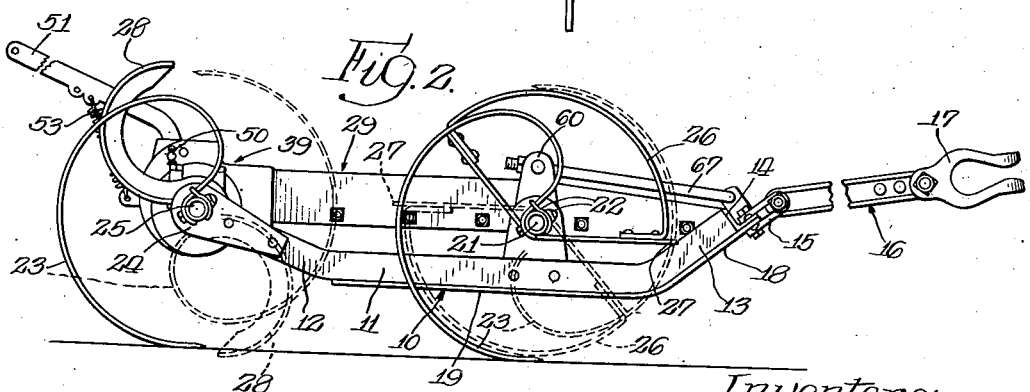
Fig. 2 is a side elevational view of the same showing the spring teeth in operative position in full lines and inoperative position in dotted lines.

In illustrating one form of our invention, we have shown the same as comprising a main frame constituting a single section generally indicated by the reference character 10. This main frame includes two longitudinally extending side frame angle members 11 which have their rear ends inclined upwardly and rearwardly as shown at 12 in Fig. 2 of the drawings. The forward ends of each of these side frame members 11 are similarly inclined upwardly so as to form runners as shown at 13. The forward ends of each of these side frame members 11 are connected by a transverse angle frame bar 14. Pivotally connected to the transverse frame member 14 by means of hinges 15 is a draft frame formed by three forwardly converging draft members generally indicated by the reference character 16. Pivotally connected to the forward end of the draft frame 16 is a conventional draft clevis 17. Secured to the forward corners of the main frame so as to form braces for the main frame and shields for the prongs of the driving runners are plates 18. Secured to each of the runners or side frame members 11 are sliding plates 19 which protect the frame members from wear in traversing over the ground. Secured to each of the side frame members at a point intermediate its ends is a bearing bracket or plate 20 in which is journaled a forward tooth bar or pipe shaft 21. Adjustably secured to the pipe shaft 21 by means of bolts and clamping members generally indicated by the reference character 22 are spring fingers or teeth 23. These spring fingers have slotted apertures which receive the bolts to effect this adjustment. These spring fingers 23 are spaced apart with respect to each other with one of the fingers located outside each of the side frame members 11 as clearly shown in Fig. 1 of the drawings. Secured to the rear end of the main frame members 11 are rearwardly and upwardly extending bearing plates 24 in which is journaled a rear teeth supporting shaft 25. Secured in spaced apart relation and adjustable with respect to the shaft 25 are a plurality of spring teeth 23 which are staggered or offset with respect to the longitudinal position of the teeth 23 on the forward shaft 21. The shaft 25 is relatively longer than the pipe 21 and projects beyond the sides of the frame members 11 so as to support the outside spring fingers in staggered relation to the forward spring fingers located on the outside of the frame on the forward shaft. Mounted on the forward shaft 21 at a point adjacent the opposite ends inside the frame members 11 are arcuate runners 26. These runners perform a double function of driving and revolving the shafts and their respective teeth from ground engaging position to raised and elevated position and support the frame of the harrow section above the ground. The arcuate portion of these runners 26 are substantially opposite the curved portion of the spring teeth 23 and each of them is provided with a substantially radially projecting spear or prong as shown at 27 which normally rides in close proximity to the ground when the teeth 23 are in the ground or in the position shown in full line in Fig. 2. In the position shown in full line in Fig. 2 the prongs 27 are shielded behind the plates 18 and are prevented from gathering trash or stalks thereon as the harrow is drawn across the field, but at the same time are so arranged with respect to the teeth 23 that the prong portion 27 of each of these runners will engage the ground before the points of the teeth are entirely raised out of the ground in the operation of turning the teeth over. Secured adjacent the opposite ends of the rear shaft 25 are arcuate runners 28 located at points just outside the side frame members 11.

One of the important features of the present invention includes a novel means for simultaneously actuating both shafts in unison and controlling their operation. This mechanism includes a housing generally indicated by the reference character 29 which is preferably made in three sections and includes a U-shaped top section 30 and two lower side sections 31 and 32 which are secured or riveted to a bottom runner plate 33 as clearly shown in Figs. 3, 6 and 7 of the drawings. The forward end of the runner 33 is inclined upwardly and is secured at its forward end by a bolt 34 to the transverse frame member 14. The upper housing portion 30 and lower sides 31 and 32 thereof are held together in spaced relation with respect to each other by a series of spaced apart bolts 36 and spacer tubes 35. Secured to the shaft or pipe 21 within the housing 29 by means of a pin 37 is a sprocket wheel 38. Secured to the rear end of the housing 29 is a rear housing section generally indicated by the reference character 39. Mounted within the rear housing section 39 and secured by means of a pin 40 through the shaft 25 is a sprocket wheel 41 which is in alignment with the sprocket wheel 38 and geared thereto by an endless drive chain 42 located within both housings. Located within the housing 39 adjacent the sprocket wheel 41 and secured to the shaft 25 by means of a pin 43 is a clutch member 44. Formed integrally with the clutch member 44 are oppositely disposed spaced apart ears 45. Formed integrally with the clutch member 44 and on the side opposite the ears 45 are similar outwardly projecting spaced apart ears 46. Journaled on the pin 47' carried by the ears 45 is a roller 47. Mounted between the ears 46 is a pin 48. Extending through an opening 49 and pivoted to the housing 39 by means of a pin 50 is a trip lever 51, which has its lower end below the pivot 50 as shown at 52 located in the path of the roller 47 and pin 48 of the clutch member 44. The upper end of the trip lever 51 is normally actuated rearwardly by a spring 53 which has its upper end thereof connected to the lever 51 as shown at 54 and its lower end connected to an ear formed on the housing 39 as shown at 55. The trip lever 51 is normally stopped in its movement rearwardly by a stop pin 56 secured to the housing, as clearly shown in Fig. 3 of the drawings. Should it be desirable to adjust the depth penetration simultaneously with all spring teeth 23 on both shafts, the pivot 50 of the trip lever 51 may be transferred to a rearwardly and downwardly positioned aperture 57 located in the housing 39. When thus changed to this position, the clutch member will stop at a position prior to that shown in Fig. 3, thereby holding the teeth to a greater depth penetration in the ground. Obviously the upper end of the trip lever 51 may be connected by a cord to the operator's seat on the tractor so that the same may be tripped from that position. The rear housing member 39 is provided with bearing portions 58 on the opposite sides thereof through which the shaft 25 extends and is journaled therein. The rear lower portion of the housing 39 adjacent the sprocket wheel 41, clutch member 44 is provided with a transverse rectangular opening or aperture 59 through which the dirt or other accumulation within the housing may be discharged by the rearward movement of the lower lap of the chain 42 as clearly shown in Fig. 3 of the drawings.

Another essential feature of the present invention includes a novel means for tightening the chain for operatively and simultaneously driving and revolving both shafts. This mechanism includes two oppositely disposed vertical plates 60 which have their lower ends pivoted by means of a bolt 61 to the outside of side housing members 31 and 32. One of these plates 60 has an aperture 62 through which the hub portion 63 of the sprocket wheel 38 extends. The other plate 60 is provided with a bearing flange 64 which forms a bearing for the shaft 21 as clearly shown in Fig. 7 of the drawings. Pivotally connected to the upper ends of each of these plates 60 and located therebetween is a swivel member 65. Extending through an aperture 66 of the swivel member 65 is a rod 67 which has its forward end pivotally connected as shown at 68 to a bracket 69, which in turn, is secured to the angle member 14 by means of the bolt 34. The rear end of the rod 67 extends through the aperture 66 and is provided with a threaded nut 69 for adjusting the plates 60 longitudinally of the housing. The housing 30 and side frame members 31 and 32 are provided with longitudinal slots as shown at 70 so as to permit the longitudinal adjustment of the shaft 21 with respect to the housing when the bolt 69 is adjusted for tightening or loosening the chain 42.

When the operator desires to connect a plurality of these sections to a single transverse frame member or bar as shown at 71 in Fig. 8 of the drawings, the usual draft frame is pivotally connected thereto, as generally indicated by the reference character 72. Each of the harrow sections may be connected by suitable link connections to the transverse draft bar 71 as shown at 73. When two or more sections are thus connected it will be observed that the section on the right or indicated at section A is identical with that section shown in Fig. 1 of the drawings, i. e., the front shaft 21 is relatively shorter than the rear shaft 25 while the left hand harrow section as indicated at B, the front shaft 21 is relatively longer than the rear shaft 25. By alternately arranging these A and B sections in this manner or as shown in Fig. 8, it will be observed that the ground between the adjacent sections will be cultivated as uniformly as is the ground over which the section proper travels. Then too, it will be observed that sufficient clearance is afforded at the sides of the sections so that the harrow either singly or in multiple permit the same to cultivate in relatively close proximity to the trees in orchard cultivation.

Summarizing the operation and advantages of our improved spring tooth harrow, it will be observed that by locating our driving mechanism for simultaneously revolving the teeth supporting shafts by a means located in the longitudinal center of each section and protecting the same from outside interference or obstruction, the efficiency of operation is assured and the difficulty encountered with harrows heretofore constructed is obviated. It will also be noted that with our improved construction the spring teeth may be separately or independently adjusted with respect to their respective shafts for securing the depth penetration of the same or all the teeth on both shafts may be simultaneously adjusted for depth penetration by merely adjusting the pivot of the trip lever.

From the above description it will also be obvious that if the operator desires to raise the teeth from ground engaging position to inoperative position or from the full line position in this figure for either transport purposes or for removing the trash gathered by the spring teeth, the lever is actuated forwardly by cord to the tractor seat when drawn by a tractor or manually drawn by tripping the trip lever 51 if drawn by a horse. When the lever is tripped, the roller 47 will revolve past the end 52 of the lever 51 by the action of the teeth 23 engaging the ground and revolving their respective shafts. As the teeth are about to leave the ground, the prongs 27 of the runners 26 engage the ground, thereby revolving both shafts uniformly and simultaneously through the endless chain 42 until the pin 48 on the clutch member engages the lower end 52 of the trip lever 51 stopping the shafts 21 and 25 upon a completion of a half revolution, thereby locking the spring teeth 23 in the dotted line position shown in Fig. 2 of the drawings. When locked in this position the harrow section may ride or be transported on the runners 26 and 28. Should the operator be desirous of revolving the spring teeth a complete revolution, the trip lever 51 may be tripped the second time and through operation of the same mechanism the teeth are stopped at their normal operative position or that position shown in full line in Fig. 2 of the drawings.

While in the above specification we have described one embodiment which our invention may assume in practice, it will of course be understood that the same is capable of modification and that modification may be made without departing from the spirit and scope of the invention as expressed in the following claims:

What we claim is our invention and desire to secure by Letters Patent is:

1. A harrow comprising a frame, transversely arranged and longitudinally spaced apart shafts journaled on said frame, cultivating teeth secured to said shafts, and gearing means extending longitudinally of and located inwardly of the ends of said shafts for operatively connecting and revolving said shafts in unison, means associated with one of said shafts for varying the tension on said gearing means, said gearing means positioned out of engagement with the ground in all positions of adjustment of said harrow.

2. A harrow comprising a frame, transversely positioned and longitudinally spaced apart shafts journaled on said frame, curved spring teeth secured to said shafts, runners secured to said shafts and arcuately spaced substantially opposite said teeth, certain of said runners having prongs adapted to engage the ground for revolving said shafts, gearing means for operatively connecting said shafts to revolve in unison, means associated with one of said shafts for varying the tension on said gearing means and runners secured to said frame for supporting said gearing means out of engagement with the ground in all positions of adjustment of said harrow.

3. A harrow comprising a frame, transversely positioned and longitudinally spaced apart shafts journaled on said frame, curved spring teeth secured to said shafts, runners secured to said shafts and arcuately spaced substantially opposite said teeth, certain of said runners having prongs adapted to engage the ground for revolving said shafts, and means carried by said frame and located in close proximity with respect to said prongs for shielding said prongs when said teeth are in their normal ground engaging positions.

4. A harrow comprising a frame, two spaced apart and transversely extending shafts journaled on said frame, adjustable curved spring teeth secured to said shafts and revolvable therewith, spaced apart arcuate runners secured to said shafts, ground engaging prongs carried by certain of said runners, shields mounted on said frame and normally protecting said prongs from gathering trash, and driving means for operatively connecting said shafts to revolve in unison.

5. A harrow comprising a frame, two spaced apart and transversely extending shafts journaled on said frame, cultivating teeth secured to said shafts, a sprocket wheel secured to each shaft, said sprocket wheels being in alignment with respect to each other, a chain for gearing said sprocket wheels together, runners secured to said frame for holding said chain and sprocket wheels in elevated position above the ground in all positions of adjustment of said harrow, means associated with one of said shafts for controlling the intermittent actuation of said shafts, and means for flexing one of said shafts for varying the tension on said chain.

6. A harrow comprising a frame, a plurality of spaced apart and transversely extending shafts journaled on said frame, cultivating teeth secured to said shafts and revolvable therewith, a sprocket wheel secured to each of said shafts at points intermediate their ends, a chain trained about said sprocket wheels for driving said shafts in unison, a housing encasing said sprocket wheels and chain, there being an opening at one end of said housing through which dirt may be discharged by said chain, a clutch member secured to one of said shafts within said housing, and a lever pivoted to said housing and engageable with said clutch member for controlling the actuation of said shafts.

7. A harrow comprising a frame, a plurality of spaced apart and transversely extending shafts journaled on said frame, cultivating teeth secured to said shafts, means for actuating both of said shafts in unison, means for adjusting the depth penetration of said teeth individually or in unison, and means for varying the tension on said first named means by flexing one of said shafts.

8. A harrow comprising a frame, a plurality of spaced apart and transversely extending shafts journaled on said frame, cultivating teeth secured to said shafts, means for actuating both of said shafts in unison, means for flexing one of said shafts for varying the tension on said first named means, means for interrupting the actuation of said shafts upon each half revolution, and means for adjusting the depth penetration of said teeth separately or in unison.

9. A harrow comprising a frame, a plurality of spaced apart and transversely extending shafts journaled on said frame, cultivating teeth secured to said shafts, means for actuating both of said shafts in unison including a sprocket wheel on each shaft and an endless chain engaging said sprocket wheels, a clutch member mounted on one of said shafts, a pivoted lever mounted on said frame and engageable with said clutch member for interrupting the actuation of said shafts upon a half revolution of said shafts, means whereby the pivot point of said lever may be changed to vary the depth penetration of all of the teeth in unison, and means for flexing one of said shafts to vary the tension of said chain.

10. A harrow comprising a frame, a plurality of spaced apart transversely extending shafts journaled on said frame, gearing mechanism operatively connecting said shafts together for actuating them in unison, and a housing encasing said gearing mechanism, there being an opening in the rear of said housing through which dirt accumulated in said housing may be discharged therefrom.

11. A harrow comprising a frame, a plurality of spaced apart transversely extending shafts journaled on said frame, a sprocket wheel secured to each of said shafts, said sprocket wheels being in alignment with respect to each other, an endless chain trained about said sprocket wheels for driving said shafts in unison, a clutch member secured to one of said shafts, a housing encasing said sprocket wheels and chain, curved spring spaced apart teeth secured to said shafts, runners secured to said shafts and engageable with the ground for actuating said shafts to lift said teeth out of the ground engageable position, a trip member pivoted to said housing and engageable with said clutch member for interrupting the actuation of said shafts on each half revolution, and means mounted on said frame and operatively connected to one of said shafts for varying the tension on said chain.

12. A harrow comprising a frame, transversely arranged shafts journaled on said frame, aligned sprocket wheels secured to said shafts, a chain trained about said sprocket wheels for driving said shafts in unison, and means mounted on said frame and operatively connected to one of said shafts for flexing said last named shaft with respect to the other for varying the tension of said chain.

RUDOLPH J. ALTGELT.
CAMERON H. GEMBERLING.